United States Patent [19]
Jennings et al.

[11] 4,127,202
[45] Nov. 28, 1978

[54] TRUE TRACKING TRAILER

[76] Inventors: Frederick R. Jennings, 7740 Obsidian Ct., Cupertino, Calif. 95014; James O. Moritz, 15830 Rica Vista Dr., San Jose, Calif. 95127

[21] Appl. No.: 847,136

[22] Filed: Oct. 31, 1977

[51] Int. Cl.² .............................................. B60D 1/14
[52] U.S. Cl. ................... 214/85; 280/79.1 R; 280/408; 280/458
[58] Field of Search ................. 214/85; 280/408, 458, 280/62, 47.14, 47.16, 79.1 R

[56] References Cited

U.S. PATENT DOCUMENTS 2,313,235  3/1943  Grove .................................. 280/408
3,294,417  12/1966  March .................................. 280/408

*Primary Examiner*—Robert G. Sheridan
*Attorney, Agent, or Firm*—Schatzel & Hamrick

[57] ABSTRACT

A stablized, true tracking trailer adapted to be cross-coupled with other true tracking trailers into a train, each trailer having a vehicle body including a cargo bed and having a fixed wheel and two castor wheels supporting the body, thereby providing a stable 3 point contact with the ground, a first and second pivotal connector attached proximate opposite corners of the first end of the body, and a third and fourth pivotal connector attached proximate opposite corners of a second end of the body for use with trailer cross-coupling linkage arms.

10 Claims, 11 Drawing Figures

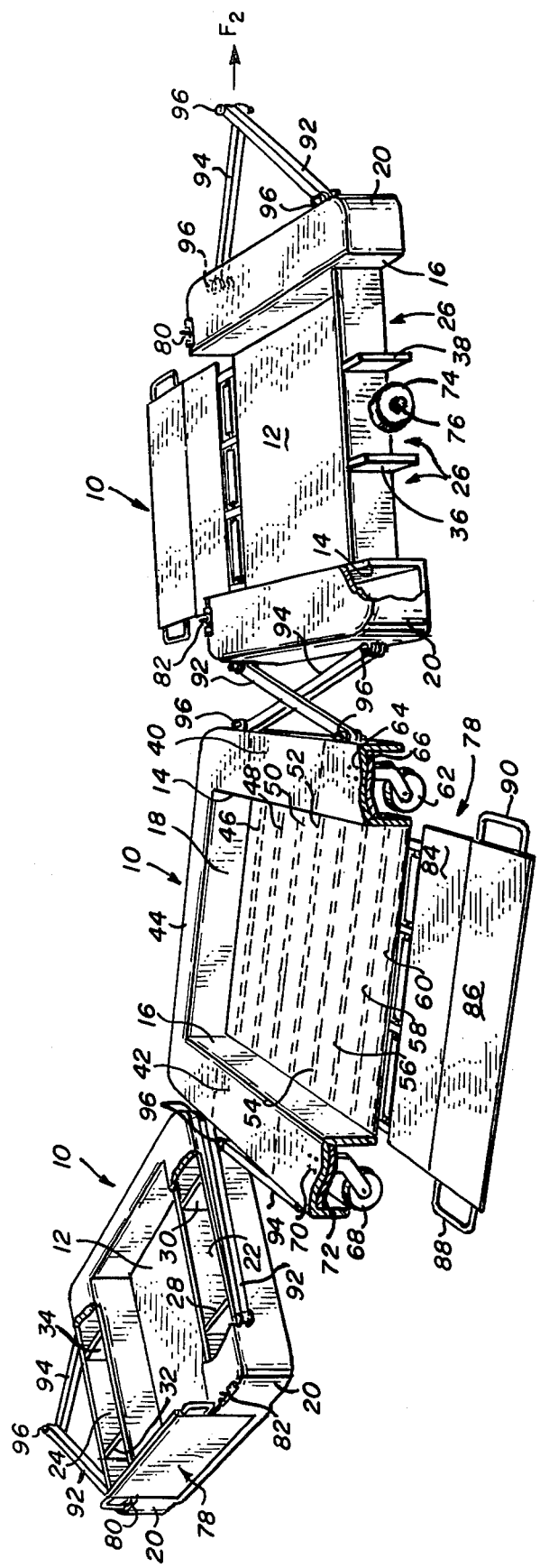
Fig_1

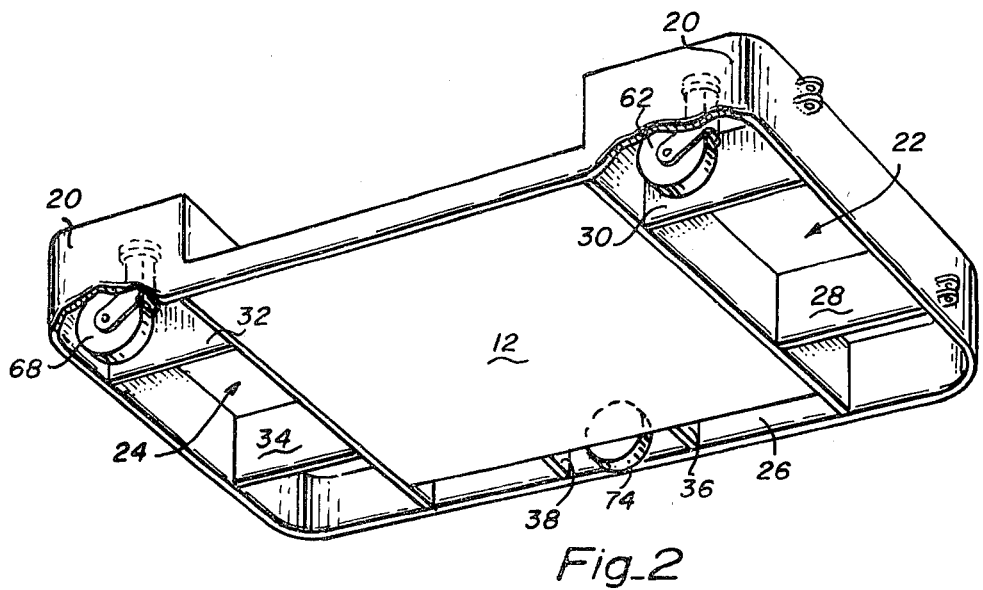
Fig_2
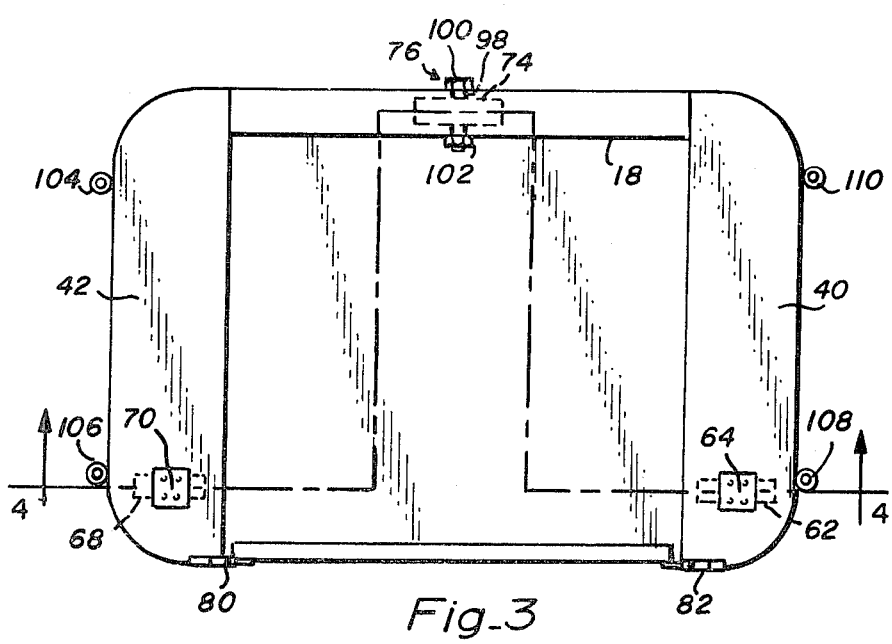
Fig_3
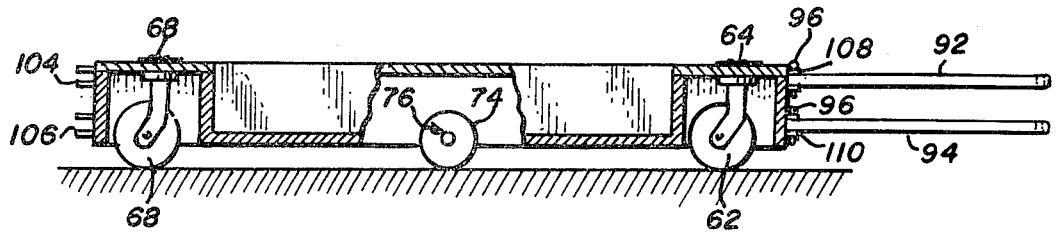
Fig_4

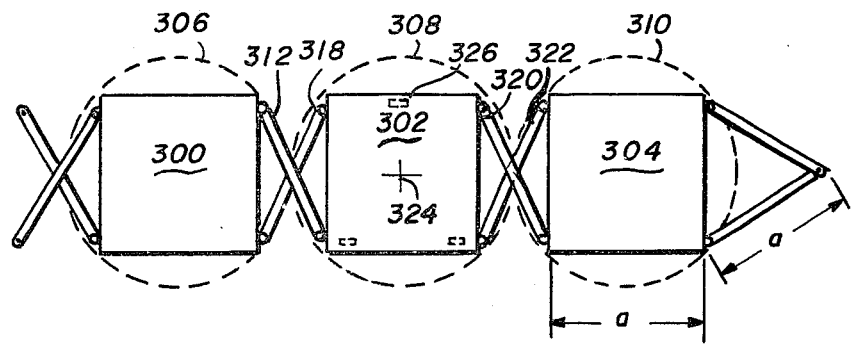
Fig_9a
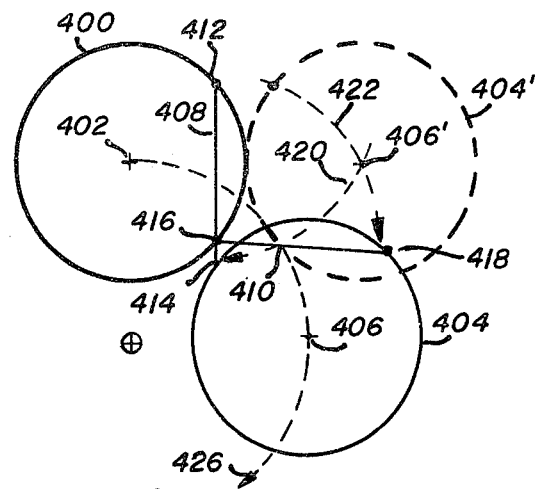
Fig_9b
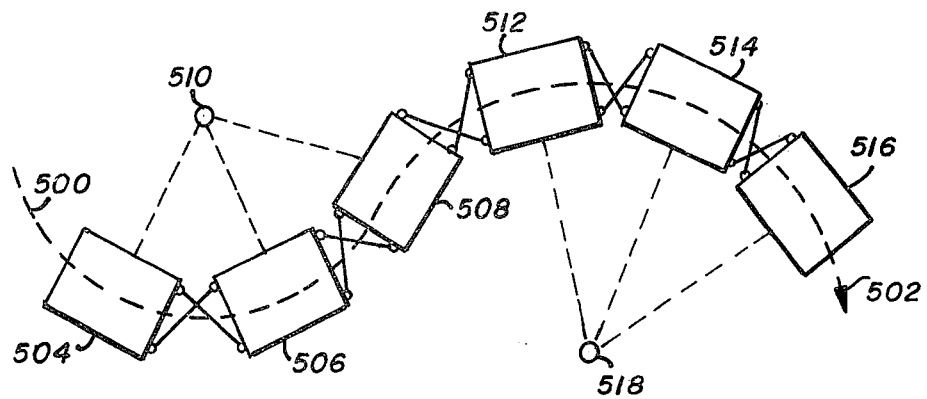
Fig_9c

TRUE TRACKING TRAILER

BACKGROUND OF THE INVENTION

1. Field of the Invention

This invention relates generally to cargo carrying trailers and more particularly to stable, true tracking trailers that can be cross-coupled into a train of trailers.

2. Description of the Prior Art

Trailers are commonly used to transport cargo from one place to another. These trailers are usually hitched to some means of locomotion, such as a tugger or a forklift, and towed. To be tractable, trailers must have at least one fixed wheel in contact with the ground at all times. Trailers supported fully by castor wheels have the tendency to meander, and are generally unmanageable. Trailers found in the prior art show indications that their designers have gone to great lengths to assure that at least one fixed wheel remains on the ground. For instance, in U.S. Pat. No. 2,649,965, J. P. King et al discloses a trailer that keeps its fixed wheels in contact with the ground by raising the castors from the plane of contact defined by the fixed wheels. While effective in keeping a fixed wheel on the ground, this approach introduces a pronounced "tippiness" or rocking motion to the trailer.

A. March teaches another method for keeping a fixed wheel on the ground in U.S. Pat. No. 3,294,417. In March's patent a fixed wheel is connected to a center point of a lever which has an end pivotally attached to the bottom of a trailer and the other end weighted, the weight urging the wheel into ground contact at all times.

A problem that the prior art does not address is how to design a stable trailer that has one fixed wheel in contact with the ground at all times without resorting to exotic constructions and without introducing a rocking motion to the trailer.

Often times, one trailer does not have sufficient cargo carrying capability to accomodate a complete load, necessitating the coupling of a number of trailers into a trailer train. The lead trailer of the train is then hitched to a means of locomotion and the entire train is towed. A problem encountered when towing such a train is that the trailers do not exactly follow the path of the locomotive means. In direct coupled trailers, where the beds of the trailer are hitched together, there is a pronounced tendency for the trailer train to cut corners. Contrasting, where the pivoting front axle of the trailor is attached to the bed of the trailer in front of it, the train is predisposed to exaggerate the corner that the locomotive means follows. Both corner cutting and exaggeration can make tight turns in crowded environments, such as warehouses, very difficult to accomplish.

To overcome these problems, a number of true tracking trailers have been designed. For instance, one type of true tracking trailer adapted to be towed in a train has wheel steering linkages connecting the trailer to the one in front of it. Another type of true tracking trailer uses a cross link coupling system to steer the trailers.

Other examples of true tracking trailers found in the prior art include the invention disclosed by U.S. Pat. Nos. 776,405 and 2,078,756. U.S. Pat. No. 2,078,756, for instance, discloses a vehicle having four independently steerable wheels that are each connected by linkages, pivots, swivels and other coupling members to the trailers ahead. A problem with true tracking trailers of this type is that the linkages, pivots, swivels and other associated members add to the complexity of the vehicle. This, in turn, increases the cost and probability of failure of the final product. A second problem with true tracking trailers having pivotal wheels connected by linkages is that the bed of the trailer must be relatively high off the ground so that the wheel steering linkages under the bed have adequate ground clearance. This leads to top-heavy trailers and increases loading difficulties.

An example of true tracking trailers which do not use wheel linkages is found in U.S. Pat. No. 2,313,235 of C. C. Grove which discloses cross-link coupling means for towing a train of trailers. In Grove's patent first and second links couple opposite corners of two trailers, the links each being provided with a longitudinal slot and being connected together by a floating pivot retained in the slots.

A problem with connecting links together with a floating pivot is that the turning angle of the trailer is limited by the pivot which engages the end of the slots.

A problem that cross-coupled trailers of the prior art do not address is what the dimensional relationship between the cross link lengths and the trailer body's dimensions should be in order to insure that the trailers are absolutely true tracking.

SUMMARY OF THE INVENTION

It is an object of this invention to provide a stable, true tracking trailer that does not require exotic constructions to keep a fixed wheel on the ground.

It is another object of this invention to provide a trailer which, using no wheel steerage linkages, may be coupled with other trailers to form a true tracking train. It is a further object of this invention to provide a trailer which, when coupled with other trailers, will negotiate corners at a constant speed, neither decelerating before the turn nor accelerating after the turn.

It is yet another object of this invention to provide a cargo carrying trailer having a load bed that is near the ground and an integrally formed loading ramp to facilitate the loading and unloading of the trailer.

Still another object of this invention is to provide a true tracking trailer which may be towed in either direction with equal ease.

These objects have been met with a true tracking trailer which, briefly, includes a generally rectangular vehicle body having a cargo bed including a front, rear, left and right side, a front inner wall rising perpendicularly from the bed at its front side, a rear inner wall rising perpendicularly from the bed at its rear side, a C-shaped, outer front wall facing the inner front wall and attached at a first end to a first end of the inner front wall and attached at a second end to a second end of the inner front wall thereby defining a front wheel well therebetween, a C-shaped outer rear wall facing said rear inner wall and attached at a first end to a first end fo the inner rear wall and attached at a second end to a second end of said inner rear wall thereby defining a rear wheel well therebetween, a D-shaped front wheel well cover disposed over said front wheel well, a D-shaped rear wheel well cover disposed over said rear wheel well, a front castor wheel attached to said front wheel well cover and disposed within the front wheel well and in contact with the ground, rear castor wheel attached to said rear wheel well cover and disposed within the rear wheel well and in contact with the ground, a fixed wheel supporting a central portion of the vehicle body where its axis of rotation is parallel to the midlength center line of the bed, load gate means hinged to a side of said bed and pivotal connector means attached to said front and rear outer walls to be used in conjunction with cross-coupling linkage arms to connect the trailers.

An advantage of the present invention is that no steering linkages are connected to the wheels, permitting the bed to be disposed very low to the ground.

Another advantage of this invention is that the load gate allows for easy loading and unloading of the trailer without the need for power cargo handlers.

Another advantage of the present invention is that a train of true tracking trailers maintains an essentially constant distance from trailer load center to trailer load center even during turns so that the trailers neither accelerate or slow down during a turn.

Yet another advantage of this invention is that the true tracking trailer is completely symmetrical and may be towed with equal ease in either direction.

These and other objects and advantages of the present invention will no doubt become apparent after reading the following detailed description of the preferred embodiment which is illustrated in the several figures of the drawing.

IN THE DRAWINGS

FIG. 1 is a perspective view of a train of three true tracking trailers in accordance with the present invention.

FIG. 2 is a perspective view of the bottom of a single true tracking trailer as shown in FIG. 1;

FIG. 3 is a top plan view further illustrating a true tracking trailer in FIG. 1;

FIG. 4 is a cross-section of a true tracking trailer as taken along line 4—4 of FIG. 3;

FIG. 9a is a top plan view of an idealized train of true tracking trailers in accordance with the present invention;

FIG. 9b is a top plan view of two idealized true tracking trailers during a turn; and FIG. 9c is a top plan view illustrating a path taken by a train of true tracking trailers.

DETAILED DESCRIPTION OF THE PREFERRED EMBODIMENT

Figure 5:
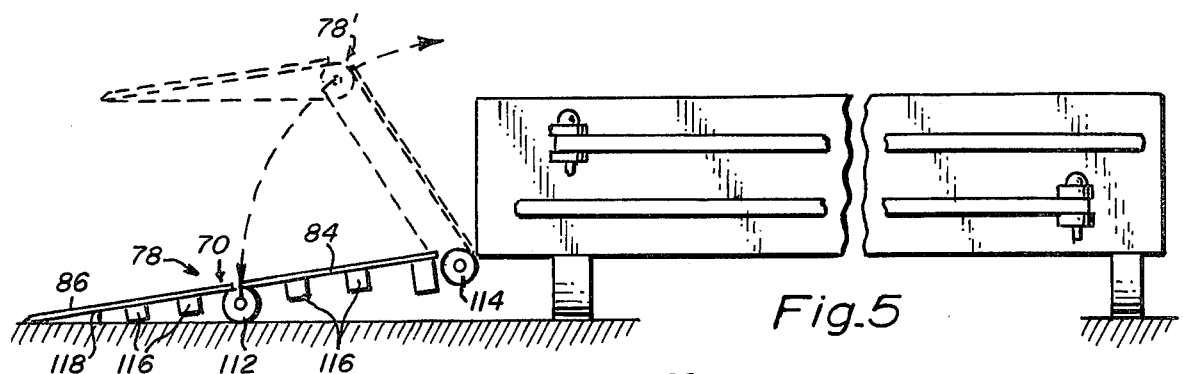
FIG. 5 is a side elevation further illustrating the load gate and showing pivotal linkage arms connected to a true tracking trailer as shown in FIG. 1.

With reference to FIG. 1, a true tracking trailer 10 of the present invention includes a vehicle body having a cargo bed 12, a front inner wall 14, a rear inner wall 16 and a side inner wall 18. The terms "front" and "rear" are fairly arbitrary since the trailer may be towed in either direction. However, for the remainder of this description and terms "front" and "rear" will be used in order to simplify the descriptive process. Furthermore, "left" and "right" shall refer to the left and right of the true tracking trailer as viewed from the rear looking to the front of the trailer.

Front inner wall 14 is attached to a front side of bed 12 with its rightmost end flush with the rightmost side of the bed and with its leftmost end extending beyond the leftmost side of the bed by several inches. Rear wall 16 is attached to the rear side of the base and has its rightmost end flush with the right side of the base and its leftmost end extending beyond the base by the same amount as front wall 14. Side wall 18 is attached to the leftmost side of the bed and has its ends connected to wall 14 and 16.

Therefore, the surface area upon which cargo is transported is surrounded on three sides by walls 14, 16 and 18 and forms what is sometimes called the "load box".

In the preferred embodiment a C-shaped, single piece, outer wall 20 completely surrounds the bed and inner walls. The outer wall is attached at a first end to rear wall 16 at its rightmost end and at a second end to the rightmost end of the wall 14. Between the inner and outer walls are formed three distinct wells 22, 24 and 26.

Wheel well 22, also known as the front wheel well, is defined as the space between inner wall 14 and the outer wall, wheel well 24, also known as the rear wheel well, is defined as the space between wall 16 and the outer wall and wheel well 26, also known as the side wheel well, is the space between inner wall 18 and the outer wall.

Within each well are two spacers which serve to further strengthen and make more rigid vehicle body. Front wheel well 22 has spacers 28 and 30, rear wheel well 24 has spacers 32 and 34 and side wheel well 26 has spacers 36 and 38.

Wheel well covers 40, 42 and 44 are disposed over wheel wells 22, 24 and 26, respectively. The wheel well covers extend completely between and connect to their respective inner walls and the outer wall.

A number of reinforcing bars 46, 48, 50, 52, 54, 56, 58 and 60 are attached to the bottom of the load bed to greatly increase static load strength.

The vehicle body, in the present embodiment, is generally rectangular in shape, having a length of approximately 72 inches and a width of approximately 51 inches. The rectangular cargo bed is large enough to easily accept a standard sized pallet. The corners of the vehicle body are rounded for a variety of design considerations, including protecting the trailer operator and nearby objects against accidental impalement against a sharp edged corner and because when the trailers are hitched into a train rounded corners allow for turns of 90° or greater by permitting the corners of consecutive trailers to bypass one another.

The terms "connected", "attached", etc., used in the preceding description of the vehicle body construction for the true tracking trailer may usually be interpreted as a welded fastening. The vehicle body, therefore, is essentially a hollow, unitized weldment of sheet metal plate that culminates in a trailer that combines light weight with great structural strength.

A front castor wheel 62, is disposed within front well 22, generally to the right of spacer 28 attached to wheel well cover 40 by a set of four bolts 64. A plate 66 is provided in the area about the attachment point to strengthen it for greater load support. A rear castor wheel 68 is disposed in rear wheel well 24 to the right of spacer 32 and is similarly attached to wheel well cover 42 by a set of four bolts 70. The area around the attachment of the castor wheel well 42 is again strengthened by an extra plate of sheet metal 72.

A fixed wheel 74 is disposed inside wheel well 26 between spacers 36 and 38 and is supported by an axle 76 which is formed by a hollow bushing which is held in compression between inner wall 18 and the outer wall by a tension bolt which runs both through it and the walls. Wheels 62, 68 and 76 provide the vehicle body with a three point or tripodal contact with the ground and, since three points always describe a plane of contact, all three wheels are always in firm ground contact. Fixed wheel 74 insures tractability by providing the trailer with a preferred direction of motion, i.e., the trailer would prefer to move in a forward direction or to pivot about the fixed wheel.

A load gate 78 is attached along the right side of bed 12 and which has two preferred positions. In a first, upper, wall-like position, the load gate forms a fourth wall for cargo bed 12 and prevents cargo from shifting or falling off the transporter. In this upright, wall-like position gate 78 is held in place by a pair of slide bolts 80 and 82. In its second, lowered position, load gate 78 may be used as a ramp to facilitate loading cargo onto bed 12. Load gate 78 is actually formed in two sections 84 and 86, the construction of which will be discussed in greater detail with reference to later figures. Section 86 is provided with handles 88 and 90 to more easily and efficiently accomplish the raising and lowering of the load gate.

An alternate embodiment for the load gate is constructed in one section, thereby resulting in a reduced ramp length but also decreasing the complexity and increasing the rigidity and strength of the ramp.

Linkage arms 92 and 94 are used to connect a true tracking trailer to another true tracking trailer or to any other device, such as a powered locomotive device. They are attached to each other and to the trailer or locomotive device by clevis pins 96. This pivotal clevis pin arrangement will be discussed in greater detail with reference to later figures.

To form a train, two or more trailers are coupled together. As can be seen in FIG. 1, the trailers may be hooked facing in either direction since they are completely symmetrical in towing characteristics. A lead trailer has its linkage arms formed into a triangularly shaped, rigid towing bar by a clevis pin 96 and may then be hitched to a standard skit jack or to a powered locomotive device such as a forklift. A second true tracking trailer is disposed behind the lead trailer with its front end aligned with the lead trailer's rear end. Linkage arms 92 and 94 are cross-coupled between the trailers and retained in place by four clevis pins so that the linkage arms are free to swing about their pivotal connection. Third and subsequent trailers are attached in a similar manner as the first two trailers.

When a turning force is applied to a lead trailer, the force is transmitted to the second trailer through criss-cross linkage arms 92 and 94. The second trailer, in turn, transmits the turning force to the third trailer and so on down the line.

Referring now to FIG. 2, a perspective view of the underbody of a true tracking trailer vehicle body is shown. Seen is cargo bed 12 surrounded by outer wall 20 and wheel wells 22, 24 and 26. Spacers 28-36 may be more clearly seen to maintain separation between the inner walls and the outer wall and to strengthen and make more rigid the vehicle body. Wheels 62, 68 and 74 may be more clearly seen as a three point ground contact.

Referring now to FIG. 3 and to FIG. 4, which is a sectional view taken along line 4—4 of FIG. 3, the wheel construction may be more clearly seen. Wheels 62 and 68 are attached to wheel well covers 40 and 42, respectively by nuts and bolts 64 and 70, respectively. This is a completely standard attachment arrangement for castor type wheels and allows for the quick removal and replacement of the wheels for repair or inspection.

Fixed wheel 74 is held in place by axle 76 which is comprised of a hollow bushing 98 extending between inner wall 18 and the outer wall and tension bolt 100 extending through the hollow bushing and through apertures in the outer and inner wall to be retained in position by a nut 102. As nut 102 is tightened on the tension bolt, wall 18 and the outer wall slightly deform inwardly to grip hollow bushing 98, firmly holding it in place.

As clearly seen in the figures, clevis type pivotal connectors 104–110 each consist of a pair of spaced apart tabs, each tab having an aligned, vertical clevis-pin hole formed therethrough. Clevis connectors 104 and 106 are attached proximate the rounded corners on the rearward portion of the outer wall, where connector 104 is mounted higher on the wall than connector 106. Similarly, clevis connectors 108 and 110 are connected to a forward portion of the exterior wall proximate the rounded corners where connector 108 is attached higher on the wall than connector 110.

Linkage arms 92 and 94, which essentially comprise a piece of square bar stock having a transverse bore fashioned proximate both ends, are, in FIG. 4, attached to clevis connectors 108 and 110, respectively, by clevis pins 96. Linkage arm 92 is spaced above linkage arm 94 so that they may easily cross and both linkage arms are fully free to pivot about the clevis pins in the clevis connectors.

In FIG. 5 a side elevation of the true tracking trailer of the present invention serves to more fully illustrate the operation and use of load gate 78. In solid lines it may be seen that sections 84 and 86 of load gate 78 are hinged together by a hinge means 112 which, in the present embodiment, comprises a series of aligned clevises, each held together with a clevis nut and bolt. Section 84 is attached to the vehicle body by a similar arrangement of clevis connectors 114 which, in this case, are held together by a single hinge bar. Roller sections, not yet shown, are provided between the clevis connectors on the hinge bar so that they may freely rotate thereon. The rollers help ease the transition between the angular loading ramp and the flat load bed.

When the loading of the transporter is complete, the load gate is lifted into an upright position by grasping handle 88 or 90 and raising it as shown in dotted lines. Section 86 folds down forward over section 84, all but obscuring it from a side view. Load gate 78 is formed in two separate sections in this manner because it is advantageous to have a long loading ramp of correspondingly slight incline without having an extremely tall gate when lifted into an upright, lateral position. When load gate 78 is raised to its upright position and section 86 folds down, the effective height of the loading gate is only equal to the height of section 84.

In this preferred embodiment, load gate 84 is approximately $10\frac{7}{8}$ inches in depth while load gate member 86 is approximately $11\frac{5}{8}$ inches in depth. Therefore, this embodiment has a total loading gate length of 22.5 inches. Since bed 12 is in very close proximity to the floor, typically 2¼ inches, the slope of the ramp is very slight. For instance, in the preferred embodiment, the slope is approximately 1 in 10 or 6°. This very slight slope makes for extremely easy loading of the trailer with conventional and inexpensive mechanisms such as a pallet jack. If the bed was any higher off the ground due, for instance, to wheel steering linkages under the bed it would be necessary to use expensive pallet lifting devices such as forklifts to load the trailer.

A number of stiffeners 116 are provided along the ramp length to provide for greater strength and a wedge-shaped member 118 is attached near the bottom of section 86 for the same reason.

Figure 6:
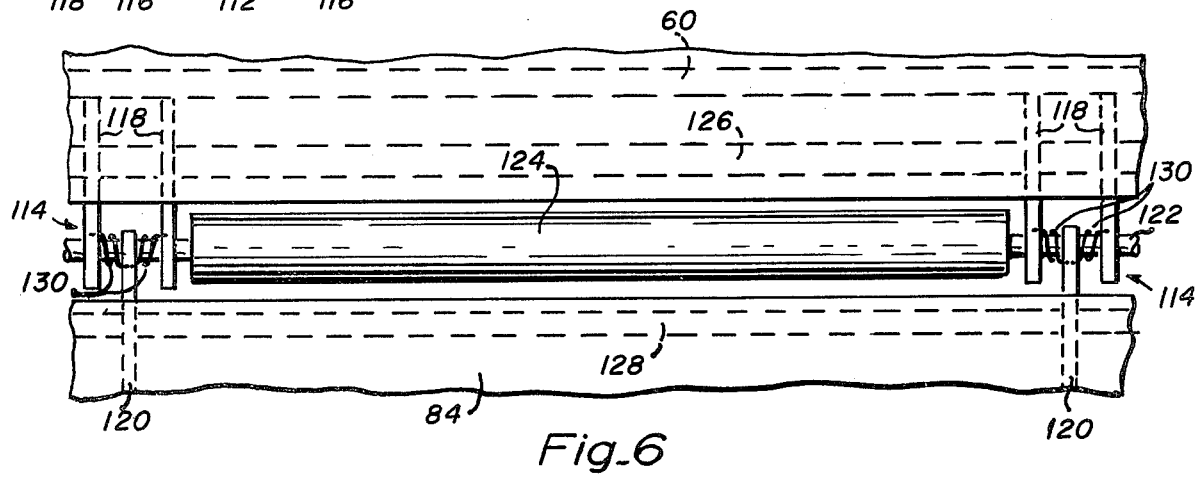
FIG. 6 is an enlarged fragmentary top plan view further illustrating the connection between the loading ramp and cargo bed of the true tracking trailer as shown in FIG. 5.

Referring now to FIG. 6, which is a partial plan view of the clevis hinge arrangement connecting section 84 to the cargo bed, members 118 are attached to the bottom of the cargo bed to form the clevis forks and members 120 are attached to the bottom of section 84 to form the clevis tongues. Holes are bored through the ends of members 118 and 120 to provide access for pivot bar 122. The load ramp section 84 is free to rotate about pivot bar 122 until limited by an obstructing wall or by a stop on section 86. Between the clevis connectors are roller sections 124 which ease the transition between the load ramp angle and the flat area of the cargo bed. A stiffener 126 is provided running between clevis members 118 to help strengthen and support the clevis members. Similarly, stiffener 128 is attached to load gate section 84 and runs between members 120 to further strengthen and support those members.

Torsion springs 130 are provided to counter-balance the ramp weight so that minimal forces need be applied to either raise of lower the gate. In this embodiment, the torsion springs are disposed about pivotal rod 122 between two clevis forks 118. A first end of each of springs 130 is attached to, or simply placed behind, each of members 118 and a second end of the spring is attached to or placed behind a member 120. This produces a torsional force which tends to raise section 84, and therefore the entire ramp, into an upright position.

Figure 7:
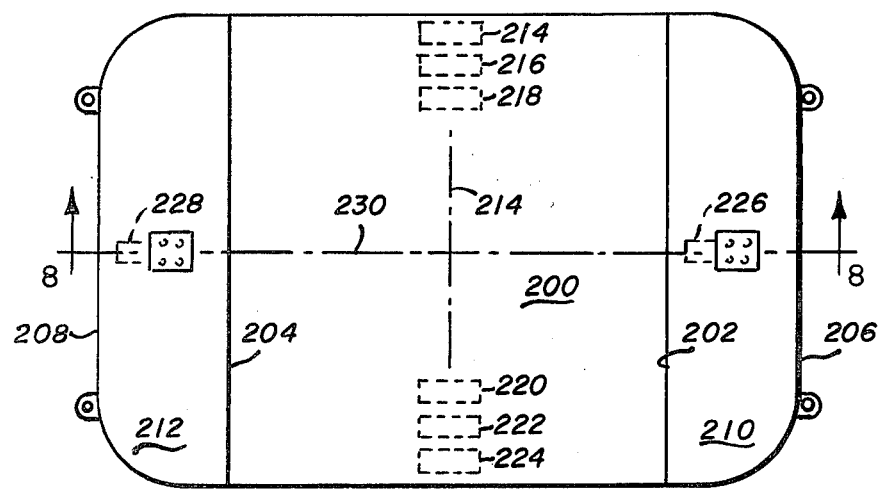
FIG. 7 is a top plan view of an alternate embodiment of the true tracking trailer in accordance with the present invention.
Figure 8:
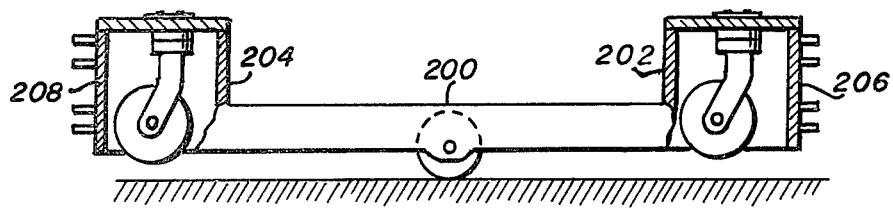
FIG. 8 is a sectional view taken along lines 8—8 of FIG. 7 and further illustrating the true tracking trailer shown in FIG. 7.

FIG. 7 is a top plan view and FIG. 8 is a partially cut away front elevation of an alternate embodiment of the true tracking trailer. This alternate embodiment has a cargo bed 200 having a front inner wall 202 and a rear inner wall 204 rising perpendicularly from its front and rear end, and a front C-shaped outer wall 206 and a rear C-shaped outer wall 208 attached to the front inner wall and the back inner wall in a manner similar to that of the previous embodiment. There is no side inner wall for the cargo bed as was in the previous embodiment so that the bed may be accessed with equal ease from either side. There is also no load gate for reasons soon to be discussed in greater detail.

D-shaped wheel well cover 210 is disposed over the front wheel well defined by walls 202 and 206 and is securely retained there, as previously indicated, by welding. Rear wheel well cover 212 is disposed over the wheel well defined between walls 204 and 208 and is securely attached to those walls.

The bed of this alternate embodiment of the trailer is relatively high off the ground compared to that of the previous embodiment. This allows for greater undercarriage clearance which is useful over uneven terrain. However, a high load deck means that a load gate would be almost useless because the angle of the ramp would be too great to allow a simple hand cart or pallet jack to load cargo onto the bed. Therefore, the load gate has been omitted in this embodiment.

Six wheels 214, 216, 218, 220, 222 and 224 are attached to the bed along midlength or longitudinal centerline 214 and castor wheels 226 and 228 are attached to wheel well covers 210 and 212 respectively along midwidth or transverse centerline 230. As clearly seen in FIG. 8, the plane of contact of wheels 214-224 is lower to the ground than that of either of the castor wheels. This, of course, produces a trailer of the "tippy" type discussed earlier. This alternate embodiment is constructed in this manner so that it may take greatly increased loads upon its load bed due to the multiplicity of load bearing wheels. This embodiment is also provided with a clevis connector arrangement, as previously discussed, for cross-coupling to other true tracking trailers.

The theory of operation of the true tracking trailers is believed to be as follows:

In FIG. 9a three true tracking trailers 300, 302 and 304 are illustrated. Ideal true tracking trailers have vehicle bodies which are square as seen from the top and have circumscribed imaginary circles 306, 308 and 310 which have points of tangency coinciding with the crossing point of the linkage arms when all of the trailers are linearly aligned. If the length of one of the sides of vehicle body is taken as "a", the length of a link 312, 318, 320, 322, etc., is also "a". This of course, necessitates that the pivotal attachment points of the links be slightly displaced from the corners of the square vehicle body. Each square body, and consequentially the imaginary circle circumscribed around the body, has a center of tracking 324. The factors contributing to true tracking in a trailer then enclude (a) a square vehicle body (b) linkage arms that are of the same length as a side of the vehicle body, (c) linkage arms being attached in a crisscross manner between two adjacent trailers, and (d) a fixed wheel attached on a center line equidistant along the length of the vehicle body.

The actions of the linkage arms during a turn are illustrated in FIG. 9b. A first trailer is idealized by a circle 404 with a center 406. Trailer 404 has been displaced from its original position as indicated by the broken lined circle 404' with center 406'. A first linkage arm 408 and a second linkage arm 410 connect the two trailers. Linkage arm 408 is pivotally connected to trailer 400 at a point 412 and to trailer 404 by pivotal connector 414 and linkage arm 410 is pivotally connected to trailer 400 at point 416 and to trailer 404 by pivotal connector 418.

As a force is applied to trailer 404 to move it to a new position, the end of linkage arm 408 attached to trailer 404 describes an arc 420 which exactly intersects with center point 406', where trailer 404 was originally. Similarly the end of linkage arm 410 attached to trailer 404 describes an arc 422 which exactly intersects center point 406' where trailer 404 was originally. This pivoting of the linkage arms through the center of the last position of the trailer 404 induces center point 402 of trailer 400 to pivot accordingly, exactly following the same radius of turn as trailer 404 which in this case is illustrated as radius of turn 426.

The illustrated turn of trailer 404 is, of course, exaggerate for purposes of clearly showing the linkage aciton. In true-to-life cases, trailer 404 would be moved or displace only fractionally at any instant in time and trailer 400, which is attached to it, will follow its radius of turn by pivoting through the center point of the previous location of trailer 404. Since, practically speaking, it is impossible to tow a train of trailers in an absolutely straight line, the trailer's actual path will be a series of curves of varying radii. Yet, no matter what the radius of turn is for a particular trailer, the trailer behind it will follow that path exactly.

Referring now to FIG. 9c, a train of true tracking trailers may be seen following a curved path consisting of a first turn 500 and a second turn 502. Trailers 504, 506 and 508 have a center of turning 510 and trailers 512, 514 and 516 have a center of turning 518. These turns 500 and 502 may be as sharp as indicated, or on the other hand, they may be greatly exaggerated and more or less describe a straight line. In either case, a trailer always follows the exact curved path of the trailer in front of it.

Although the idealized trailers as previously described give a theoretically perfect true tracking path, it has been found that lengthening the true tracking trailer into a rectangular shaped vehicle body does not substantially influence the true tracking characteristics of the trailer. In fact, a preferred embodiment of the present invention has a vehicle body 1½ times long as it is wide.

Although the present invention has been described above with reference to a particular preferred embodiment, it is understood that modifications thereof will be obvious to those skilled in the art. It is therefore intended that the appended claims be interpreted to cover all such modifications as fall within the spirit and scope of this invention.

What is claimed is:

1. A true tracking trailer apparatus comprising:
   first and second generally rectangular trailer vehicles each of which includes;
   a rectangular, planar cargo bed having a front, rear, left and right side and a longitudinal centerline extending between said front and rear sides and a transverse centerline extending between said left and right sides,
   a front inner wall rising perpendicularly from the plane of the bed at said front side and a rear inner wall rising perpendicularly from the plane of the bed at said rear side,
   outer wall means having a front portion disposed forward of said front inner wall and having a rear portion disposed rearward of said rear inner wall whereby a front wheel well is defined between said front portion and said front inner wall and a rear wheel well is defined between said rear portion and said rear inner wall,
   a front castor wheel supporting said vehicle and disposed in said front wheel well,
   a rear castor wheel supporting said vehicle and disposed in said rear wheel well,
   a fixed wheel supporting said vehicle and having an axis of rotation parallel to and aligned with said transverse centerline,
   means connecting said second vehicle to said first vehicle including;
   a first linkage arm pivotally connected at a first end of said second vehicle along a first side of said longitudinal centerline and pivotally connected at a second end to a second end of said first vehicle along a second side of said longitudinal centerline; and
   a second linkage arm pivotally connected at a first end to a first end of said second vehicle along a second side of said longitudinal centerline and pivotally connected at a second end to a second end of said vehicle along a first side of said longitudinal centerline;
   whereby said true tracking trailer apparatus may be towed in either direction and whereby said trailer apparatus maintains an essentially constant distance between load centers of said trailers.

2. A true tracking trailer apparatus as defined in claim 1 further comprising a side inner wall rising perpendicularly from the plane of said bed at a first side and wherein said outer wall means further includes a side portion disposed sideward away from said bed and facing said side inner wall, whereby a side wheel well is defined between said side portion and said side inner wall.

3. A true tracking trailer apparatus as defined in claim 2 wherein said fixed wheel is disposed in said side wheel well.

4. A true tracking trailer apparatus as defined in claim 3 wherein said bed is disposed low to the ground.

5. A true tracking trailer apparatus as defined in claim 4 further comprising
   a load gate;
   a first hinging means for attaching a side of said gate to a second side of said bed; and
   latching means for retaining said gate in an upright position.

6. A true tracking trailer apparatus as defined in claim 5 wherein said load gate is comprised of first and second sections attached together by a second hinging means.

7. A true tracking trailer apparatus as defined in claim 6 further comprising handle means attached to said second section to facilitate the raising and lowering of said load gate.

8. A true tracking trailer apparatus as defined in claim 5 further comprising spring means attached to said gate at a first end and said bed at a second end whereby said spring means exerts a force tending to raise said gate, thereby counterbalancing the weight of said gate.

9. A true tracking trailer apparatus as defined in claim 1 wherein said vehicle body is square.

10. A true tracking trailer apparatus as defined in claim 9 wherein said first and second linkage arms are equal in length to a side of said vehicle body.

* * * * *